United States Patent [19]

Reno

[11] Patent Number: 4,768,184

[45] Date of Patent: Aug. 30, 1988

[54] APPARATUS AND METHOD FOR MINIMIZING MAGNIFICATION DISTORTION IN MULTI-TRACK OPTICAL RECORDING

[75] Inventor: Charles W. Reno, Cherry Hill, N.J.

[73] Assignee: General Electric Company, Camden, N.J.

[21] Appl. No.: 6,205

[22] Filed: Jan. 23, 1987

[51] Int. Cl.$^4$ .......................... G11B 7/14; G02B 26/08
[52] U.S. Cl. ....................................... 369/112; 369/54; 369/55; 369/122; 350/64
[58] Field of Search ............................. 369/100, 44–46, 369/111, 112, 116, 117, 122; 350/287, 484, 6.4, 168, 286; 250/201; 346/76 L, 108

[56] References Cited

U.S. PATENT DOCUMENTS

| | | | |
|---|---|---|---|
| 4,101,199 | 7/1978 | Christensen | 350/286 |
| 4,222,071 | 9/1980 | Bell et al. | 346/76 L |
| 4,449,215 | 5/1984 | Reno | 369/111 |
| 4,453,241 | 6/1984 | van de Veerdonk et al. | 350/287 |
| 4,520,472 | 5/1985 | Reno | 369/112 |
| 4,545,651 | 10/1985 | Kato et al. | 369/112 |
| 4,621,351 | 11/1986 | Baer et al. | 369/44 |
| 4,643,538 | 2/1987 | Wilson | 369/122 |

Primary Examiner—Donald McElheny, Jr.
Attorney, Agent, or Firm—Clement A. Berard, Jr.; William H. Meise

[57] ABSTRACT

A multi-beam optical recording system includes a semiconductor laser array. The laser beams are expanded via a prism beam expander to have generally circular cross-sections for optimum spot intensity on the recording medium. According to the teaching of the prior art, the average beam angle of incidence on the input prism of the beam expander is the Brewster angle. According to the present invention, means are provided for rotating the beam expander to minimize the variations in spacing between beams, these variations resulting from the magnification distortion of the prisms of the beam expander.

17 Claims, 4 Drawing Sheets

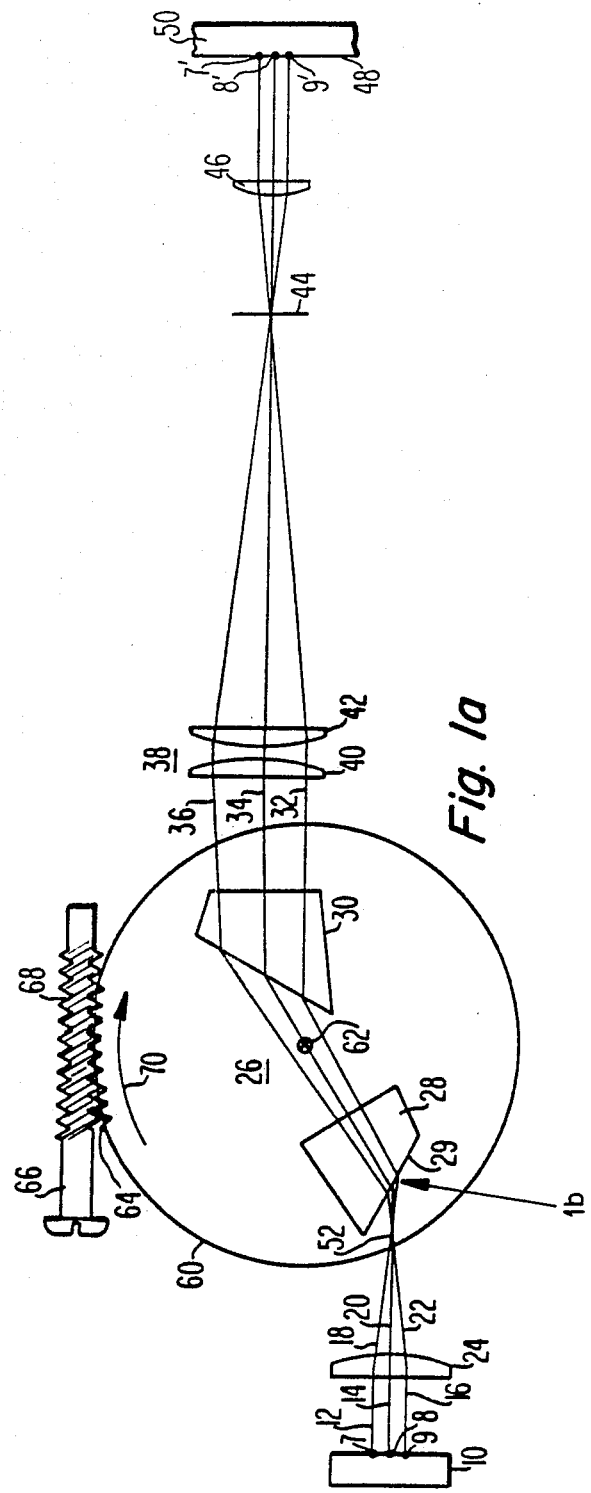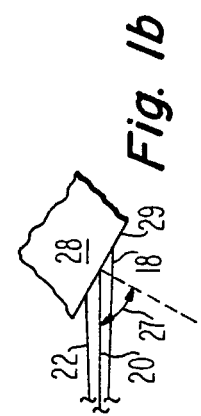
Fig. 1a
Fig. 1b

APPARATUS AND METHOD FOR MINIMIZING MAGNIFICATION DISTORTION IN MULTI-TRACK OPTICAL RECORDING

The Government has rights in this invention pursuant to a government contract.

This invention relates generally to optical recording systems and more particularly, to a method for minimizing the track pitch variations due to magnification distortion in a multi-beam optical recording system.

BACKGROUND OF THE INVENTION

Optical recording/playback of information has been made possible by developments in the areas of lasers and thermal record media. Recent developments have led to mass data storage systems utilizing a plurality of individually modulated laser beams to record information at extremely high data rates. For example, in U.S. Pat. No. 4,449,212, issued on May 5, 1984, in the name of the instant inventor, a multi-track record/playback apparatus is described. In the multi-track apparatus the light beam from a single high power laser is split into a plurality of beams which are individually modulated and focused onto the surface of a record medium. In general, systems of this type require large, high power lasers which require external cooling. Furthermore, in these systems a modulator is provided to individually modulate each beam of the multiple beams being used for recording. For these reasons, prior art multi-beam systems tend to be bulky, low in efficiency, and difficult to modulate.

The recent introduction of semiconductor laser arrays has led to the development of multi-channel optical recorders/players which overcome some of the problems of the prior art multi-channel systems. A diode laser array system is generally more compact, has higher efficiency, and requires no external modulation.

In U.S. Pat. No. 4,520,472, issued May 28, 1985, in the name of the instant inventor, an optical system is described for use in a multi-channel record/playback system. The optical system includes a laser diode array and an optical head comprising a collection objective, an anamorphic beam expander, a relay lens and a focusing lens having a finite conjugate. The optical head collects the laser beams emitted by the diode array, expands the beam cross-section to form circular beams and focuses the beams to diffraction limited spots. The relay lens images the lasing spots from the laser diode array in the conjugate plane of the finite conjugate focusing lens.

In a multi-channel system of the Reno ('472) type, the beam expander, which may typically comprise two prisms, compensates for the elliptical character of the laser diode beams, reshaping their emission patterns into symmetrical beams, i.e., circular beams, so that the highest possible spot intensity can be obtained at the recording surface. It has been common practice to direct the central beam expander at an angle equal to the Brewster angle.

When a beam of linearly polarized light is incident on the surface bounding two transparent media of different refraction indexes such that the incident beam vibrates in the plane of incidence, there exists a certain angle of incidence for which the intensity of the reflection beam is equal to zero. That angle $\phi$ is called the polarization angle, or Brewster angle, and is related to the indexes of refraction of the two media, $n_1$ and $n_2$, by the expression $$\phi = \tan^{-1}(n_2/n_1).$$

It is noted that when the central beam of a multi-beam diode array, e.g., an array of nine beams, is incident on a prism beam expander at the Brewster angle, there is a variation in the magnification ratios which may be 5 to 6 percent between the least and the greatest. These variations manifest themselves in an optical recording system as variations in track spacing on the recording surface. Since the smallest beam spacing of the array must determine the recording track pitch, the 5 to 6 percent variation across the array produces inefficiency in the recording surface utilization.

SUMMARY OF THE INVENTION

In accordance with the principles of the present invention, there is disclosed an optical system comprising at least three solid state elements emitting respective coherent light beams having generally elliptical cross-sectional shapes. The solid state elements are arranged in a linear array having substantially equal spacings between adjacent pairs of the elements. The system also includes a first lens for collecting the respective coherent light beams emitted by the array of solid state elements and forming the respective coherent light beams into collimated light beams. The system further includes a beam expander for anamorphically expanding the collimated light beams to reshape the cross-sections of the collimated light beams such that the cross-sectional shape of the collimated light beams is generally circular. The beam expander comprises a pair of prisms, which distort the spacings between adjacent pairs of the beams due to unequal transit paths of the respective beams through the pair of prisms. Finally, the system includes means for minimizing variations in the spacings between adjacent pairs of the beams including means for adjusting the angles of incidence of the collimated light beams formed by the first lens on the beam expander by rotating the beam expander along an axis which is intermediate the pair of prisms and normal to the collimated light beams.

BRIEF DESCRIPTION OF THE DRAWINGS

FIG. 1a illustrates an optical system for reducing the magnification distortion in multi-track optical recording in accordance with the principles of the present invention;

FIG. 1b is a magnified view of the beam rays striking a prism in the FIG. 1a apparatus;

DETAILED DESCRIPTION OF THE PREFERRED EMBODIMENT

Figure 2:
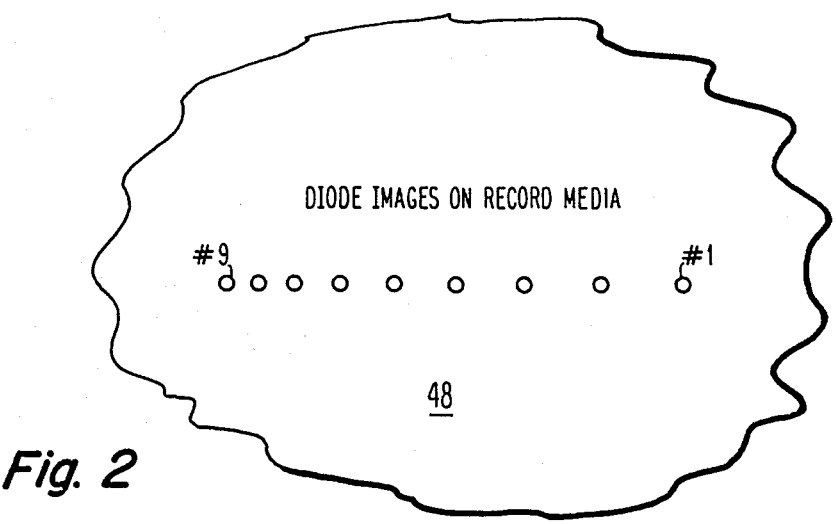
FIG. 2 illustrates, in exaggerated scale, the image diode spots resulting from magnification distortion.

Referring to FIG. 1a, there is shown an optical system for collecting a plurality of laser beams emitted by a diode array, expanding the beam cross-sections to form circular beams, and focusing the beams to diffraction limited spots. Semiconductor laser array 10 is a linear array which emits a plurality of light beams, typically nine, although for ease of understanding, the principal rays of only three beams 12, 14 and 16 emitted from diode elements 7, 8 and 9, respectively, are shown in FIG. 1a. The diode elements of array 10 are equally spaced from each other, typically 150 micrometers.

Beams 12, 14 and 16 have a generally elliptical cross-sectional shape. They are collected into collimated, but not parallel, beams 18, 20 and 22, respectively, by a collection objective lens 24. Illustratively, collection objective lens 24 may be a plano-objective microscope lens. Collimated beams 18, 20 and 22 are incident on the incoming prism 28 of anamorphic beam expander 26 which comprises prisms 28 and 30. Illustratively, prisms 28 and 30 may be formed of high index glass, e.g., Schott LaSF-8, having an index of refraction of 1.788 at 830 nanometers. According to the teachings of the prior art, anamorphic beam expander 26 is positioned so that the angle of incidence 27 on surface 29 of prism 28, which is seen more clearly in the magnified view of FIG. 1b, of a central beam 20 from array 10, is the Brewster angle, which, for the glass specified above by way or example, is 60.787 degrees.

In the FIG. 1a embodiment, beams 12, 14 and 16 emitted from semiconductor laser device 10 are set at the polarization in which the electric field vector vibrates in the plane parallel to the sheet of the figure. Collection objective lens 24 is arranged in its focal position with respect to laser device 10 so as to render beams 18, 20 and 22 incident on surface 29 of prism 28 as collimated beams. With the polarization as specified and with beams 18, 20 and 22 incident on surface 29 of prism 28 at substantially the Brewster angle, there is, theoretically, virtually no reflection from surface 29. Beams 18, 20 and 22 are refracted through prisms 28 and 30 such that the beams that exit from prism 30 are parallel to their original optical axes.

The refraction of the beams through anamorphic beam expander 26 expands elliptical beams 18, 20 and 22 in a plane parallel to the sheet of the figure while leaving the beams unaffected in a plane perpendicular to the sheet. Thus, the beams 32, 34 and 36 exiting from prism 30 are generally circular in cross-section. Illustratively, the expansion factor of beam expander 26 may be three.

Beams 32, 34 and 36 exiting beam expander 26 from prism 30 are incident on relay optics 38 consisting of a doublet of lenses 40 and 42. Relay doublet 38 may possibly be a singlet if the aberrations of the singlet lens can be tolerated. The relay lens system 38 images the lasing points 7, 8 and 9 of array 10 at plane 44, which is the focal plane of lens system 38. The focusing lens 46, which is chosen to be a finite conjugate lens, has its finite conjugate plane coincident with the image plane 44.

From plane 44, lasing spots 7, 8 and 9 are imaged as 7', 8' and 9' on surface 48 of record medium 50. Illustratively, record medium 50 may be of a type disclosed in U.S. Pat. No. 4,222,071, issued in the name of A. E. Bell et al. Illustratively, a Bell-type record medium may be a disk having a light sensitive surface upon which ablative recording by the thermal effects of a focused laser beam may be made. Alternatively, record medium 50 may be a magneto-optic record disk, having on its surface 48 a magnetic material which causes the polarization angle of laser light to be changed when reflected from a recorded spot.

The effect of the relay lens 38 is to take the exit pupil 52 of objective lens 24 where the beams 18, 20 and 22 emitted by laser diodes 7, 8 and 9, respectively, are coincident and image that exit pupil 52 into the entrance pupil of lens 46, i.e., completely filling lens 46 to form diffraction limited spots 7', 8' and 9', respectively, on surface 48. The magnification of the beams may be adjusted by varying the doublet design of relay lens 38.

In the present example, in which the laser diodes 7, 8 and 9 are linearly spaced from each other by 150 micrometers, the focal length of collection objective lens 24 is typically 9.75 millimeters, resulting in angular divergences between adjacent beams 18,20 and 20,22 of $$\theta = \sin^{-1}(0.15/9.75) = 0.88°.$$

These angular displacements cause beams 18, 20 and 22 to enter prism 28 of beam expander 26 along non-parallel axes. Thus, beams 32, 34 and 36 exiting prism 30 are unequally spaced from each other due to the unequal transit paths of beams 32, 34 and 36 through prisms 28 and 30. As a result, the diffraction limited spots 7', 8' and 9' focused on surface 48 are unequally spaced.

The unequal spacing of the focused images of a semiconductor laser array of nine diodes is shown (exaggerated) in FIG. 2. This distortion is quantitatively shown in the plot of FIG. 3, which illustrates the inter-spot spacing on a relative scale. Considering a central inter-spot spacing, e.g., the spacing between the fourth and fifth diodes, as the reference, it may be observed from FIG. 3 that the spacing between the first and second diodes is 1.3 percent greater, and the spacing between the eighth and ninth diodes is 4.5 percent less, than the reference.

Figure 3:
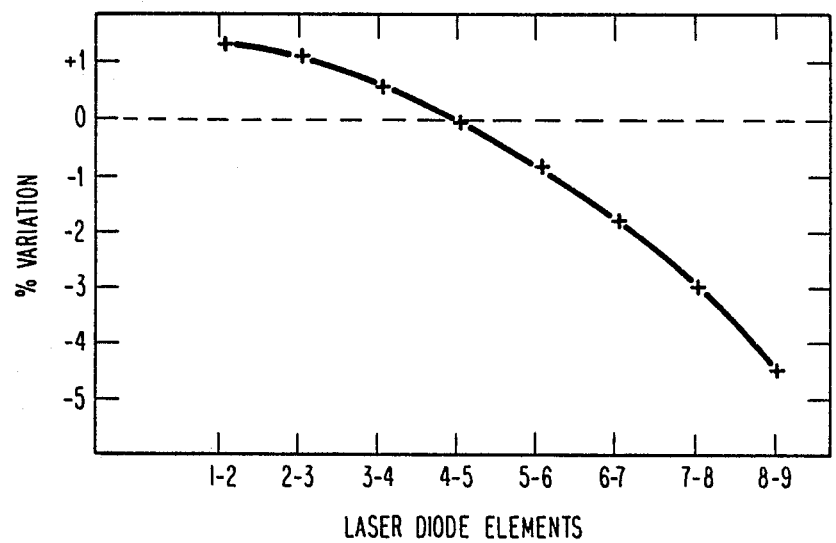
FIG. 3 is a plot which quantitatively describes the magnification distortion.

As a result of experimentation, I have found that the curve obtained by joining the points of the FIG. 3 plot becomes a saddle shape as the average input angle of beams 12, 14 and 16 onto prism 28 is reduced to an incident angle less than the Brewster angle, which is used in the prior art teachings.

Referring again to FIG. 1a, in accordance with the principles of the present invention, anamorphic beam expander 26 is mounted on carriage 60 which allows a small amount of rotation of beam expander 26 about a central axis 62 located between prisms 28 and 30 and normal to the sheet of the figure. Carriage 60 may, by way of example, have a generally circular peripheral surface including a plurality of radially-extending gear teeth 64. Lead screw 66 includes threads 68 in mesh engagement with gear teeth 64. It will be observed that clockwise solution of leadscrew 66 causes rotation of carriage 60 about axis 62 in the direction indicated by arrow 70, thus reducing the angle of incidence 27 of beams 18, 20 and 22 on the incoming surface 29 of prism 28 (see FIG. 1b).

Figure 4:
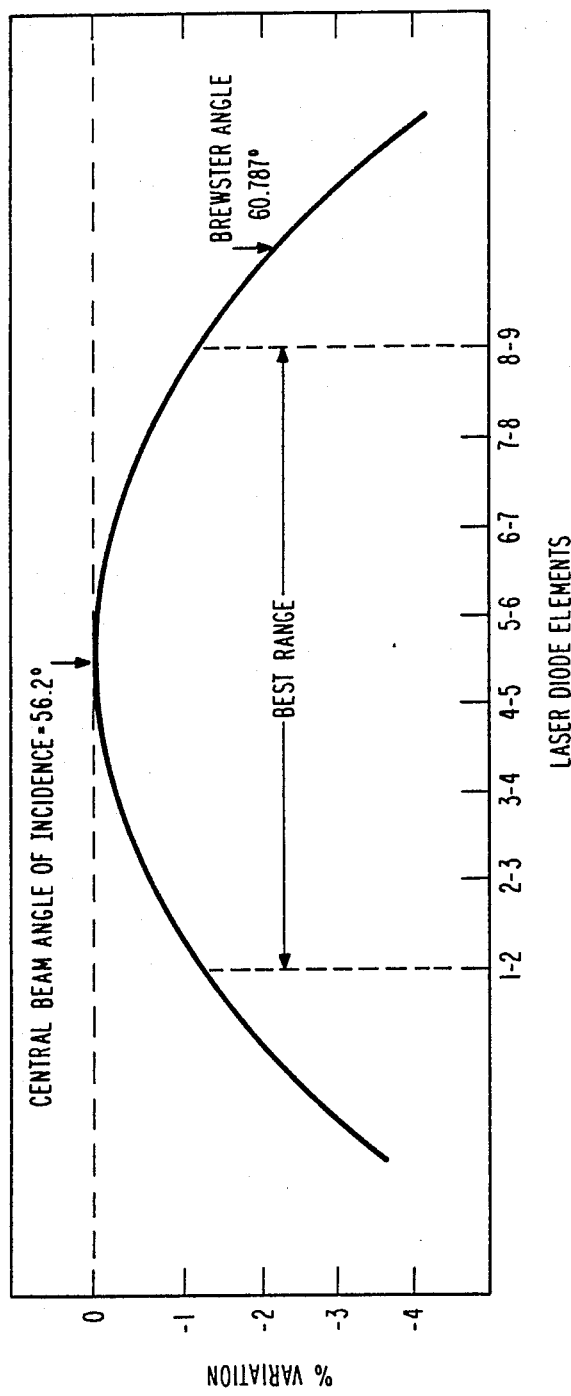
FIG. 4 is a plot showing the effect of the FIG. 1 apparatus on the magnification distortion.

Referring to FIG. 4, there is shown a plot depicting improved inter-spot spacings according to the present invention. The curve represents the variations of inter-spot spacings over an array of nine laser diode elements. Whereas the prior art teaches an incident angle for the central beam at the Brewster angle, the present invention teaches that the curve of inter-spot spacings is saddle-shaped, and that the optimum angle of central beam incidence is less than the Brewster angle, viz., approximately 56.2° for the present example, resulting in a maximum inter-spot spacing variation of 1.3 percent.

Figure 5:
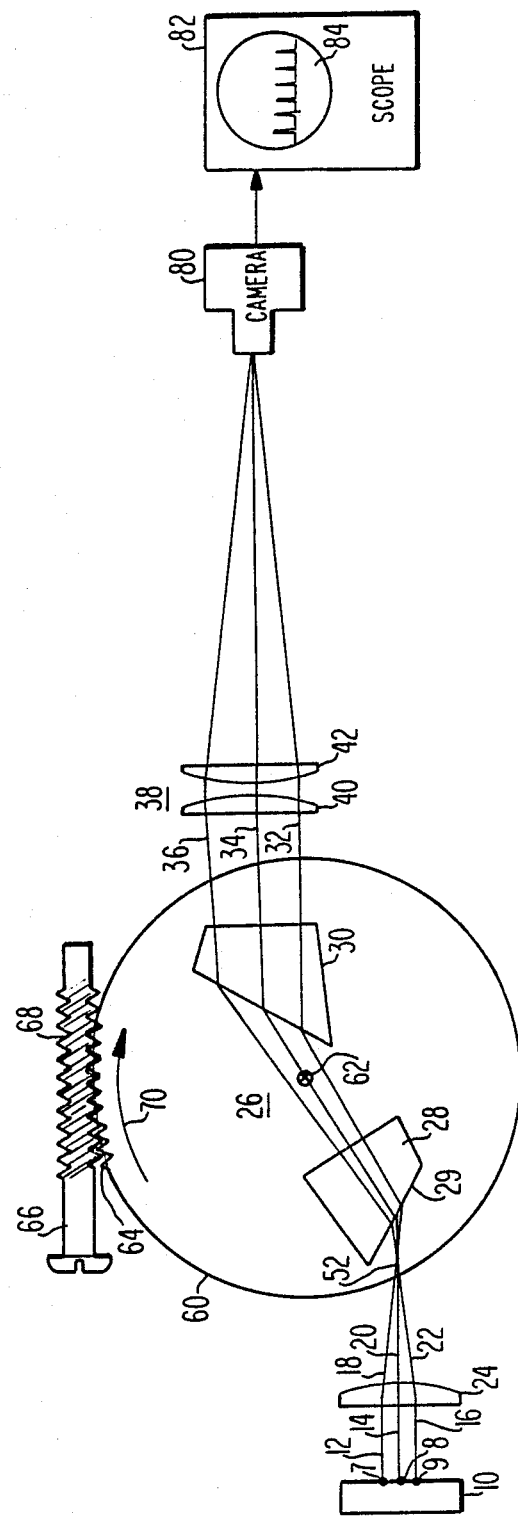
FIG. 5 illustrates an apparatus for use in practicing the method of the present invention.

The principles taught by the present invention may be practiced in a method using the apparatus illustrated in FIG. 5. The FIG. 5 apparatus uses the same elements as the FIG. 1a apparatus, but replaces focusing lens 46 and record medium 50 with apparatus for detecting and measuring the spacings between beams 32, 34 and 36, including detecting means, typically a charge-coupled device (CCD) camera 80, responsive to the radiant energy from beams 32, 34 and 36, and measuring means, typically an oscilloscope 82, responsive to the output signal from camera 80.

The oscilloscope display 84 includes a linear sequence of pulses which are unequally spaced when the central beam 20 is incident on surface 29 of prism 28 at the Brewster angle. According to the teaching of the present invention, rotation of leadscrew 66 such that carriage 60 is rotated in a direction which reduces the angle of incidence 27 of central beam 20 on surface 29 of prism 28 (see FIG. 1b), reduces the variations in spacing between adjacent beams. In the FIG. 5 embodiment, this reduction will be manifest on display 84 as a shifting of the relative positions of the pulses representing beams 32, 34 and 36 input to camera 80. According to the present invention, minimization of the effects of magnification distortion caused by beam expander 26 is achieved when the spacings between the outermost beams and their respective adjacent beams are equal. As seen in FIG. 4, when the outermost spacings (1-2 and 8-9) are equal, the inter-spot spacings are centered on the top of the saddle curve, and the spacings are minimized. Practicing the method using the apparatus of FIG. 5 requires the rotation of beam expander carriage 60 until the outermost pulses of display 84 are equally spaced from their respective adjacent pulses.

While the principles of the present invention have been demonstrated with particular regard to the illustrated structure and method of the figures, it will be recognized that various departures from such illustrative structure and method may be undertaken in practice of the invention. As an example, since it is obvious that the orientation of beam expander 26 with respect to incoming beams 18, 20 and 22 needs to be set only once, the adjusting means comprising lead screw 66 and gear teeth 64 may be replaced by a far simpler means for adjusting the position of carriage 60. The scope of this invention is therefore not intended to be limited to the structure and method disclosed herein but should instead be gauged by the breadth of the claims which follow.

What is claimed is:

1. An optical system comprising:
   at least three solid state elements emitting respective coherent light beams having generally elliptical cross-sectional shapes, said solid state elements being arranged in a linear array having substantially equal spacings between adjacent pairs of said elements;
   a first lens for collecting said respective coherent light beams emitted by said array of said solid state elements and forming said respective coherent light beams into collimated light beams;
   a beam expander for anamorphically expanding said collimated light beams to reshape the cross-sections of said collimated light beams such that the cross-sectional shape of said collimated light beams is generally circular,
   said beam expander comprising a pair of prisms, said prisms distorting the spacings between adjacent pairs of said beams due to unequal transit paths of said respective beams through said pair of prisms; and
   means for minimizing variations in said spacings between adjacent pairs of said beams including means for adjusting the angles of incidence of said collimated light beams formed by said first lens on said beam expander by rotating said beam expander along an axis which is intermediate said pair of prisms and normal to said collimated light beams.

2. The optical system according to claim 1 wherein said solid state elements are spaced apart by 150 micrometers.

3. The optical system according to claim 1 wherein said linear array includes nine solid state elements.

4. The optical system according to claim 1 wherein said beam expander further including carriage means for holding said pair of prisms in a fixed angular relationship.

5. The optical system according to claim 4 wherein said carriage means includes a generally circular peripheral surface having a plurality of radially-extending gear teeth, and wherein said adjusting means includes a leadscrew in mesh engagement with said gear teeth.

6. The apparatus according to claim 1 wherein said means for minimizing variations includes means for providing an angle of incidence of a central beam of said collimated light beams on said beam expander which is less than the Brewster angle.

7. An optical system for processing information on the surface of a record medium, said system comprising:
   at least three solid state elements emitting respective coherent light beams having generally elliptical cross-sectional shapes, said solid state elements being arranged in a linear array having substantially equal spacings between adjacent pairs of said elements;
   a first lens for collecting said respective coherent light beams emitted by said array of said solid state elements and for forming said respective coherent light beams into collimated light beams;
   a beam expander for receiving said collimated light beams and for anamorphically expanding said collimated light beams to reshape the cross-sections of each of said collimated light beams for generatring expanded collimated light beams in which the cross-sectional shape of each of the beams of said expanded collimated light beams is generally circular, said beam expander comprising a pair of prisms, said prisms distorting the relative spacings between adjacent pairs of said beams due to unequal transit paths of said beams through said pair of prisms;
   a second lens for receiving said expanded collimated light beams from said beam expander and for focusing said expanded collimated light beams as respective diffraction limited sports on said surface of said record medium; and
   means for minimizing variations in the spacings between adjacent pairs of said diffraction limited spots on said record medium surface including means coupled to said beam expander for adjusting the angles of incidence of said collimated light beams on said beam expander rotating said beam expander along an axis which is intermediate said pair of prisms and normal to said collimated light beams.

8. The optical system according to claim 7 wherein said first lens has an exist pupil from which said collimated light beams diverge and said second lens has a finite conjugate, said optical system further including a third lens for relaying said exit pupil of said first lens into the entrance pupil of said second lens, said third lens forming an image of said array of solid state elements in the finite conjugate plane of said second lens.

9. The optical system according to claim 7 wherein said solid state elements are spaced apart by 150 micrometers.

10. The optical system according to claim 7 wherein said linear array includes nine solid state elements.

11. The optical system according to claim 7 wherein said beam expander further including carriage means for holding said pair of prisms in a fixed angular relationship.

12. The optical system according to claim 11 wherein said carriage means includes a generally circular peripheral surface having a plurality of radially-extending gear teeth, and wherein said adjusting means includes a leadscrew in mesh engagement with said gear teeth.

13. The apparatus according to claim 7 wherein said means for minimizing variations includes means for providing an angle of incidence of a central beam of said collimated light beams on said beam expander which is less than the Brewster angle.

14. In an optical information processing system including at least three solid state elements emitting respective coherent light beams having generally elliptical cross-sectional shapes, said solid state elements being arranged in a linear array having substantially equal spacings between adjacent pairs of said elements; a first lens for collecting said respective coherent light beams emitted by said array of said solid state elements and forming said respective coherent light beams into collimated light beams; and a beam expander for anamorphically expanding said collimated light beams to reshape the cross-sections of said collimated light beams such that the cross-sectional shape of said collimated light beams is generally circular, said beam expander comprising a pair of prisms, said prisms distorting the spacings between adjacent pairs of said beams due to unequal transit paths of said respective beams through said pair of prisms; a method for minimizing variations in said spacings between adjacent pairs of said beams emergent from said beam expander, said method comprising the steps of:

measuring said spacings between adjacent pairs of said emergent beams; and rotating said beam expander along an axis which is intermediate said pair of prisms and normal to said collimated beams until said variations in said measured spacings are minimized.

15. The method according to claim 14 further including an initial step of orienting said beam expander with respect to said collimated light beams such that a central one of said beams is incident on a first prism of said pair of prisms at an angle which is approximately the Brewster angle; and wherein said rotating step includes rotating said beam expander so as to reduce said incident angle.

16. The method according to claim 14 wherein said system further includes detection means for detecting the spacings between adjacent pairs of said emergent beams, and means coupled to said detecting means for displaying said spacings; said measuring step including the steps of:

coupling said emergent beams to said detecting means; and observing said spacings displayed by said displaying means.

17. The method according to claim 16 wherein said displaying means provides a visual representation of a linear sequence of pulses, said rotating step being performed until said observing step confirms that the outermost pulses of said linear sequence are substantially equally distant from their respective adjacent pulses.

* * * * *